US005779852A

United States Patent [19]

Haney et al.

[11] Patent Number: 5,779,852

[45] Date of Patent: Jul. 14, 1998

[54] HANDHELD APPLICATOR

[75] Inventors: David A. Haney, Boca Raton; Sergio M. Perez, Boynton Beach; Jeffrey J. Ronan, Deerfield Beach; Jon D. Buzzard, Margate; Howard M. Schenkel, Boca Raton; Edward P. Ellers, Lake Worth, all of Fla.

[73] Assignee: Sensormatic Electronics Corporation, Boca Raton, Fla.

[21] Appl. No.: 661,719

[22] Filed: Jun. 11, 1996

[51] Int. Cl.$^{6}$ .................................................. B32B 31/00

[52] U.S. Cl. ......................... 156/577; 156/523; 156/542; 156/579

[58] Field of Search .................................... 156/523, 574, 156/577, 542, 579

[56] References Cited

U.S. PATENT DOCUMENTS

| | | | |
|---|---|---|---|
| 3,440,123 | 4/1969 | Hamisch, Sr. | 156/579 X |
| 4,406,727 | 9/1983 | Fujita | 156/579 X |
| 4,986,874 | 1/1991 | Kawada | 156/579 X |
| 5,110,401 | 5/1992 | Huang | 156/577 X |
| 5,294,068 | 3/1994 | Baro et al. | 242/55.53 |
| 5,399,228 | 3/1995 | Schroeder et al. | 156/542 |
| 5,516,398 | 5/1996 | Goto | 156/542 X |

*Primary Examiner*—James Engel

*Attorney, Agent, or Firm*—Robin, Blecker & Daley

[57] ABSTRACT

An applicator for use in applying labels adhered to a release liner, the labels being in the form of a roll. The applicator comprises a body having a trigger and a roll holder for supporting the rolled release liner, an indexer for positioning label formats of varying pitch in the applicator and stripping labels from the release liner, an applicator assembly for applying the labels which were positioned by the indexer, and a friction drive responsive to the trigger for advancing the release liner through the applicator assembly. The friction drive includes a self-adjusting tensioner which includes a drive slip which allows the drive to slip when the label is correctly positioned by the indexer in the applicator. The drive slip includes a slip means for allowing the drive to slip when the label is correctly positioned, enabling the largest pitch label to be completely stripped from the release liner. A quick release allows tension from the friction drive to be released by removing the thrust roller from frictional contact with the friction drive roller is also provided. The indexer includes a slipping actuator to correctly position label formats of varying pitch by causing the friction drive to slip once the label is correctly positioned in the applicator. The applicator includes a label holder which holds the label after the label is completely stripped from the release liner, the label holder is positioned so the label protrudes from the body. The label holder includes two concave channels which hold the label.

34 Claims, 11 Drawing Sheets

HANDHELD APPLICATOR

BACKGROUND OF THE INVENTION

This invention relates to dispensers for labels carried on a roll, and, in particular, hand held dispensers for dispensing labels having a thickness greater than the thickness of normal paper labels.

Electronic article surveillance (EAS) systems are used for inventory control and to prevent theft and similar unauthorized removal of articles from a controlled area. Typically, in such systems, a system transmitter and a system receiver are used to establish a surveillance zone which must be traversed by any articles being removed from the controlled area.

An EAS label is affixed to each article and includes a marker or sensor adapted to interact with the signal being transmitted by the system transmitter into the surveillance zone. This interaction causes a further signal to be established in the surveillance zone which further signal is received by the system receiver. Accordingly, upon movement of a labeled article through the surveillance zone, a signal will be received by the system receiver, identifying the unauthorized presence of the tagged article in the zone.

In the manufacture of certain types of EAS labels, the labels are formed in a line on a liner or backing which acts as a carrier for the labels. The liners are then wound into a cord to form a roll for transporting the labels and from which the labels can be dispensed for attachment to individual articles. In order to protect the labels and to permit easy release of the labels from the roll, a dispenser is used to house the roll and to detach individual labels from the roll.

The EAS label dispensers used to date, however, are not capable of applying thick EAS labels, i.e., labels having a thickness greater than normal paper labels, such as, for example, the thick labels sold by Sensormatic Electronics Corporation under the name ULTRA-MAX™. Moreover, these thick EAS labels, and the liner to which they are attached, do not have features which would permit the labels to be applied by more conventional pricing label applicators (i.e. there are no tractor feed slots in the release liner and the label pitch (distance between the labels) is not accurate enough to allow proper indexing of the labels).

In addition, the thick EAS labels are rigid, making it difficult to successfully apply them onto soft product packaging. Accordingly, if the item the store wishes to protect has not been "source tagged", then the store personnel must either hand-apply the thick EAS labels to the products, or use an existing table top applicator. Hand application is slow and time consuming for store personnel.

The table top applicator is an electro-mechanical device intended to be used in a back part of the store. While being an excellent alternative to hand application, the electro-mechanical applicator is not portable and requires an electrical power supply to operate.

It is therefore an object of the present invention to provide an applicator which can be hand held so that it may be used at different locations in a store, and which provides a dependable means of applying to consumer products EAS labels having a thickness greater than the thickness of normal paper labels.

It is a further object of the present invention to be able to dispense and apply a variety of labels through the use of a novel modular design which separates the drive and dispensing unit mechanisms.

SUMMARY OF THE INVENTION

In accordance with the principles of the present invention, the above and other objectives are realized in an applicator for use in applying labels adhered to a release liner, the release liner carrying the labels being in the form of a roll. The applicator comprises a body having a trigger and a roll holder for supporting the rolled release liner, an indexing means for positioning label formats of varying pitch in the applicator and stripping labels from the release liner, an applicator means for applying the labels which were positioned by the indexing means, and a friction drive means responsive to the trigger for advancing the release liner through the applicator.

The friction drive means includes a self-adjusting tensioning means which includes a drive slip means which allows the drive means to slip when the label is correctly positioned by the indexing means in the applicator means. The drive slip means includes a slip mechanism for allowing the drive means to slip when the label is correctly positioned, enabling the largest pitch label to be completely stripped from the release liner. The slip mechanism includes a thrust roller, which, in connection with a friction drive roller, traps the release liner therebetween. Linkages link the friction drive roller with the trigger so that the trigger can actuate the friction drive roller. A quick release means which allows tension from the friction drive means to be released by removing the thrust roller from frictional contact with the friction drive roller is also provided.

The indexing means includes an actuator to correctly position label formats of varying pitch by causing the friction drive means to slip once the label is correctly positioned in the applicator means. The applicator means includes a label holder which holds the label after the label is completely stripped from the release liner, the label holder being positioned so the label protrudes from the body. The label holder includes two concave channels which hold the label.

A spring loaded pivoting paddle is operable to prevent the succeeding label from travelling into the label holder when the label holder contains a label. The paddle is deactivated and reset when the label is removed from the label holder allowing another label to enter the label holder. The paddle is pivoted when the label is located in the label holder. The paddle, when pivoted by a label located in the label holder, is operable to block a succeeding label from travelling into the label holder. The paddle is operable to pivot when the label is removed from the label holder to a position to allow a succeeding label to enter into the label holder. A tamp means is located above the label such that when the paddle and the label holder are pivoted upwards by pressing the label on an object, the tamp means is operable to press the label against the object and allow the label to roll out of the label holder and past the paddle. The indexing means is modular and is removable and insertable into the body without removing the drive means.

Also disclosed are a number of different indexing means and a number of different label holders.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
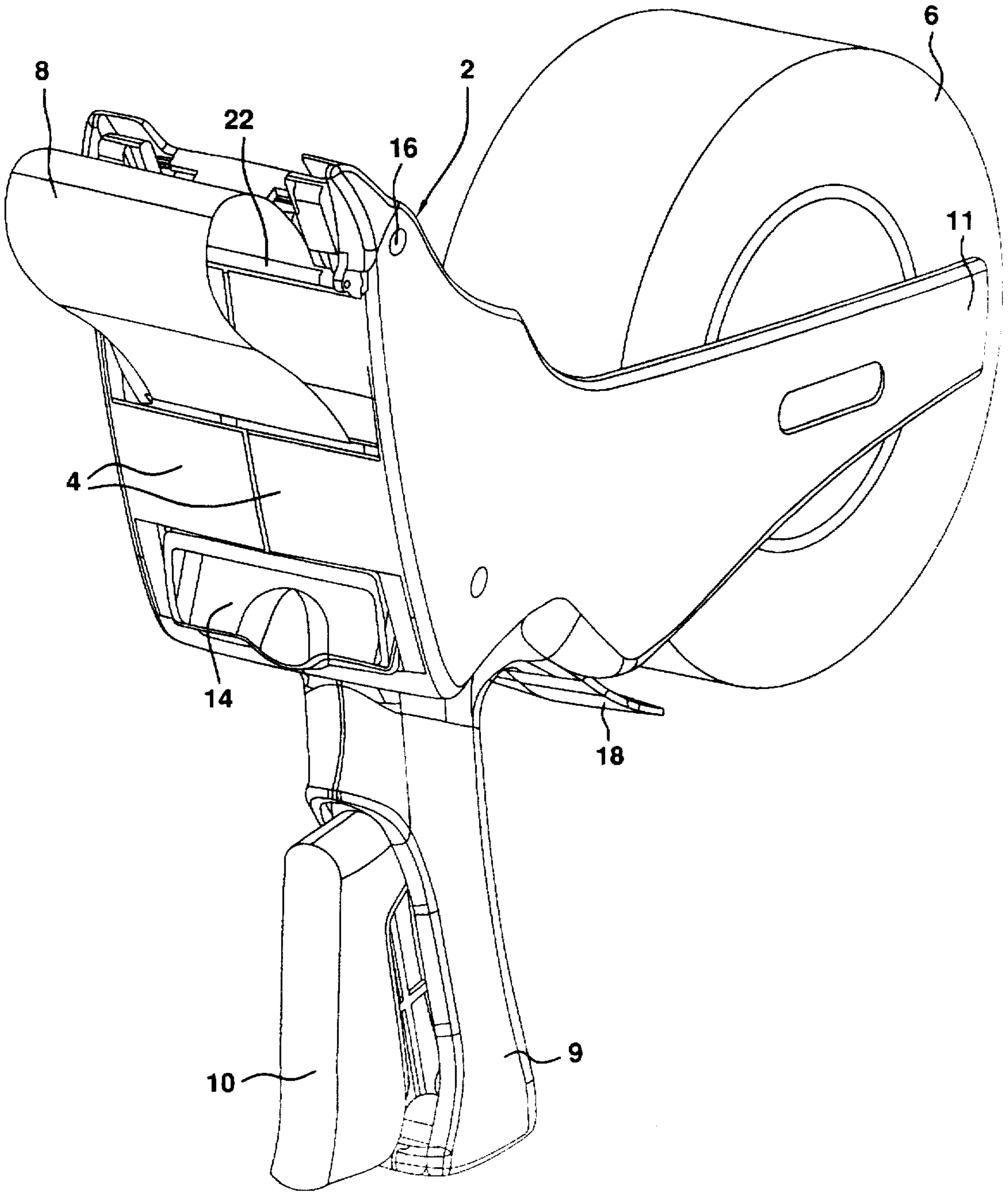
FIG. 1 shows an isometric view of a hand held applicator in accordance with the principles of the present invention.

FIG. 1 shows a hand held applicator 2 in accordance with the principles of the present invention. The hand held applicator 2 includes a two-piece plastic body 4. The plastic body 4 includes a handle 9, a roll holder 11 and a label dispensing end 13. The roll holder 11 holds a label roll 6. The handle 9 contains a trigger 10. The label dispensing end 13 contains a friction drive entrance slot 12 and a release liner exit chute 14. The two-piece plastic body 4 is held together by screws 16. A wrist guard 18 is disposed between the label roll 6 and the handle 9. Adjacent to the release liner exit chute 14 is a liner tension release 20. A stripper bar roller 22 is provided at the label dispenser end 13 of the plastic body 4.

Figure 2A:
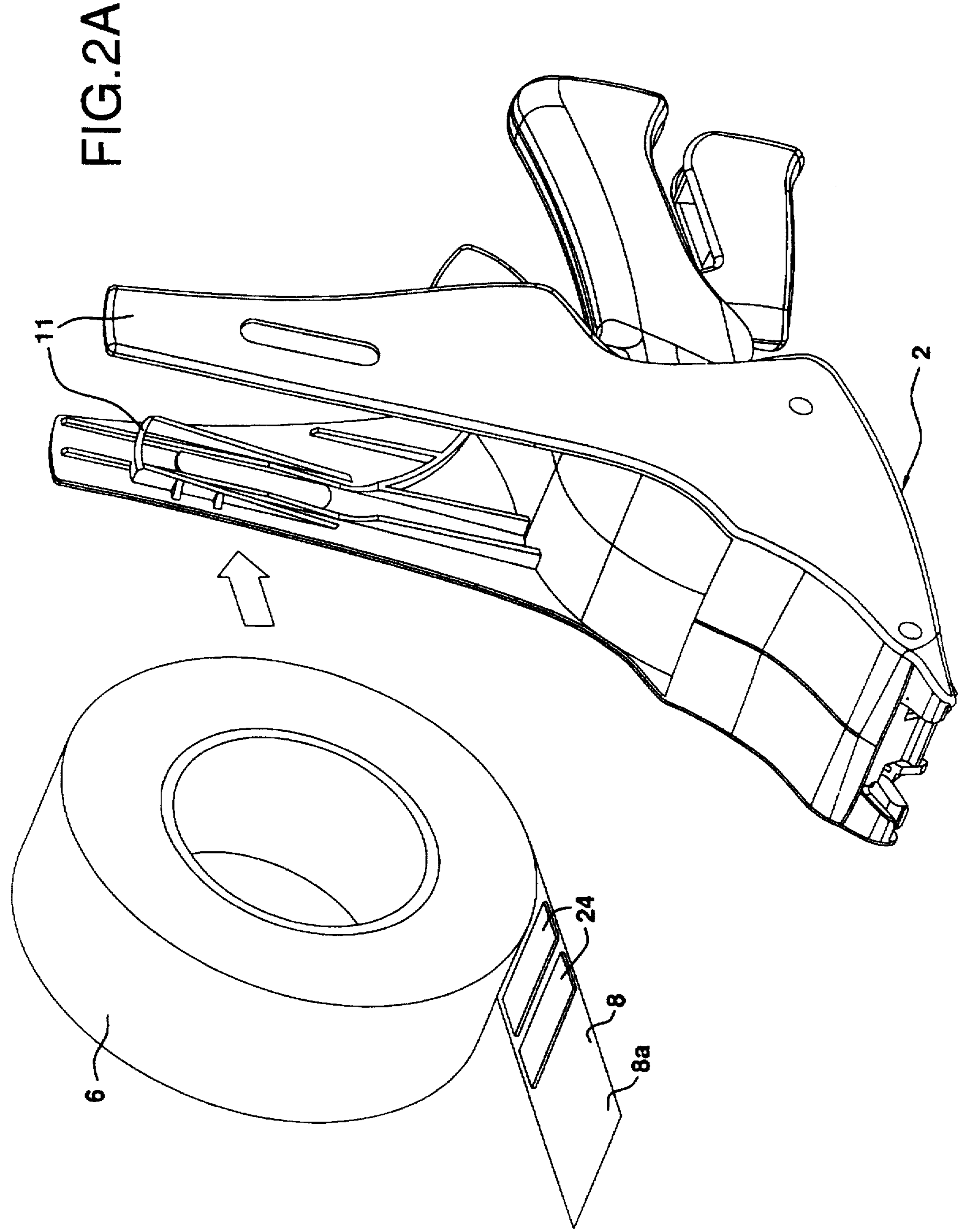
FIG. 2A shows the hand held applicator of FIG. 1 with the label roll separate from the applicator.
Figure 2B:
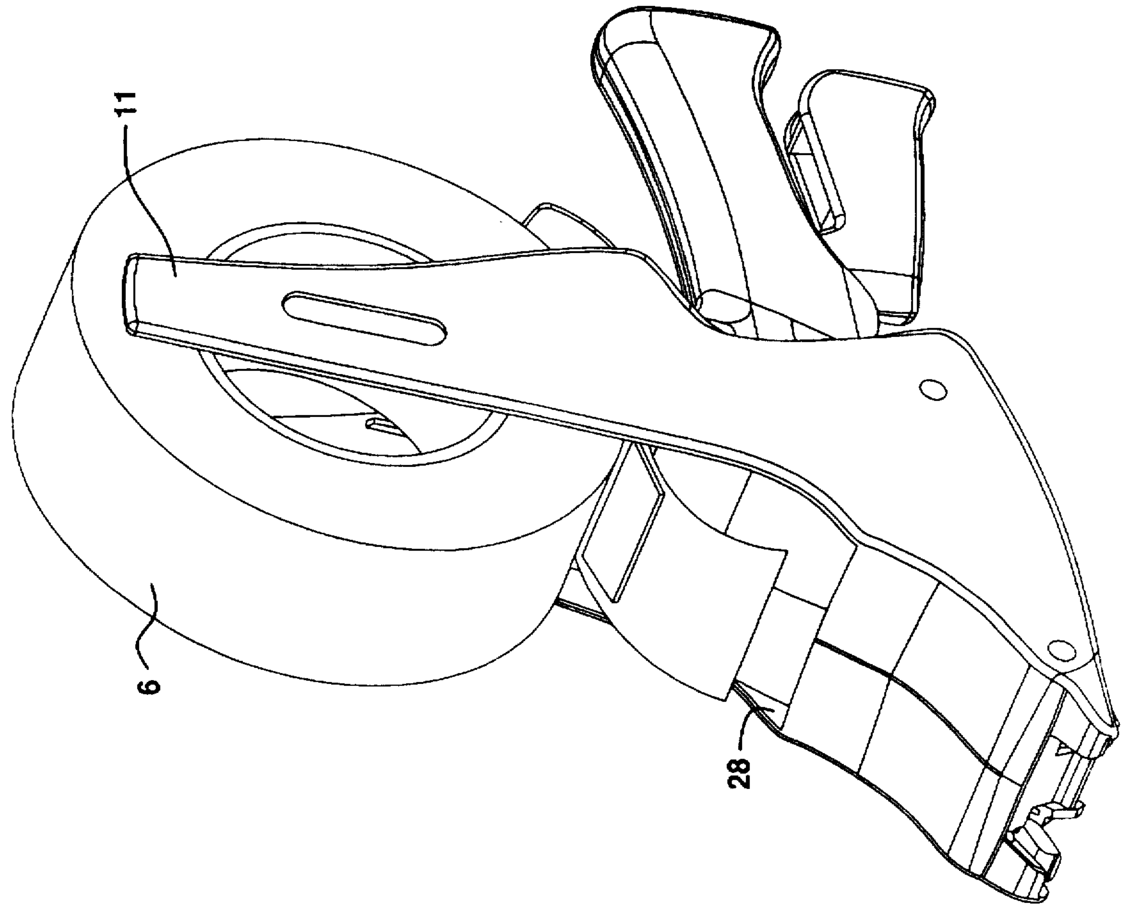
FIG. 2B shows a view from the top of the hand held applicator of FIG. 1.

FIG. 2A shows the label roll 6 separated from the hand held applicator 2. The label roll 6 contains the release liner 8 and labels 24. The label roll 6 fits into the label roll holders 11. The label roll holders 11 contain protrusions 26 which keep the label roll 6 in place. In FIG. 2B, the label roll 6 is shown inserted into the label roll holders 11.

Figure 3:
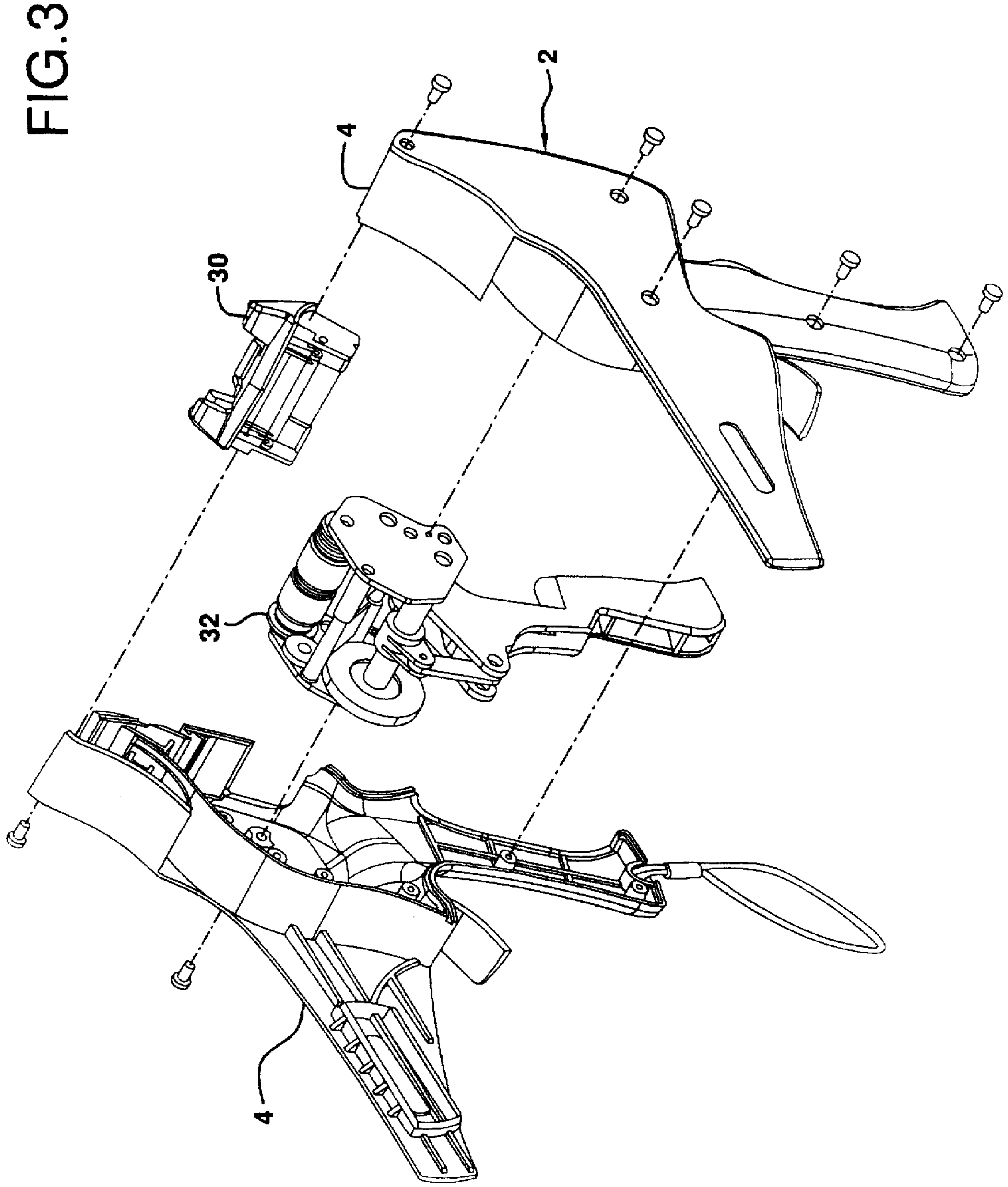
FIG. 3 shows an exploded view of the hand held applicator of FIG. 1.

As shown in FIG. 3, the hand held applicator 2 of FIG. 1 includes an indexer module 30 and a drive module 32, which are held in the two-piece plastic body 4. The drive module 32 is a friction drive and the indexer module 30 indexes the labels and assists in their application. The indexer module 30 and the drive module 32 are totally independent of each other and are assembled as separate units. The independence of the drive module 32 and the indexer module 30 enables the hand held applicator 2 to be fitted with different indexer modules 30 that are specifically suited for different types of labels 24 and/or different methods of application.

Figure 4A:
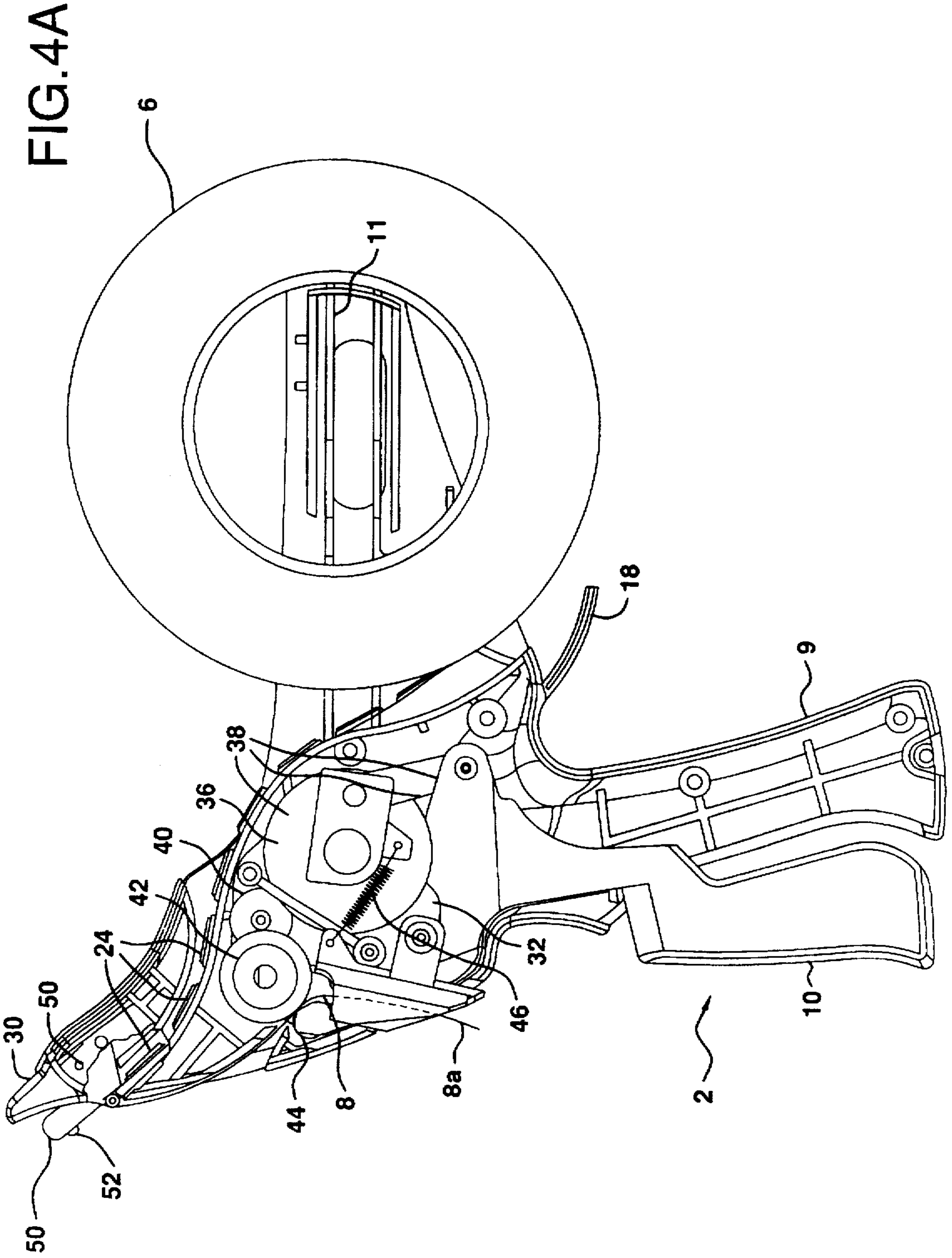
FIG. 4A shows a cut-away view of the hand held applicator of FIG. 1.
Figure 4B:
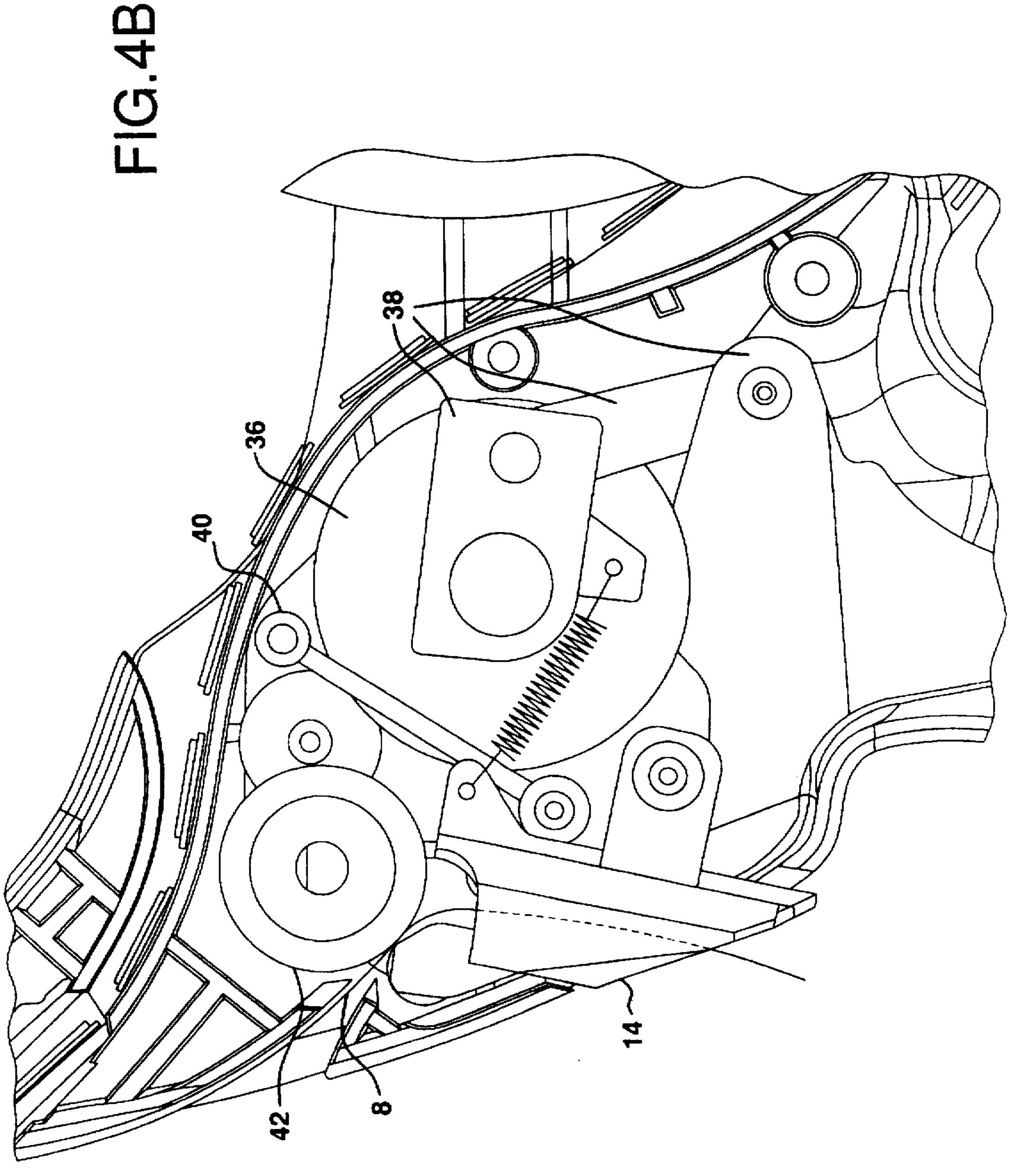
FIG. 4B shows an enlarged view of a part of the cut-away view of FIG. 4A.

FIG. 4A is a side view of the hand held applicator 2 with the drive module 32 and index module 30 in place and with one side of the plastic body removed. FIG. 4B shows an enlarged view of the part of FIG. 4A containing the drive module 32. The trigger 10 of the drive module 32 is returned to its normal position by a tension spring 46 mechanically linked to apply force to the trigger 10. The spring 46 also serves as a friction drive tensioner, as will be discussed hereinbelow. The trigger 10 is connected by linkages 38 to a pinion gear 36 which is in geared contact with an idler gear 40. The idler gear 40 is in geared contact with a friction drive roller 42. A thrust roller 44 is disposed adjacent to the friction drive roller 42.

To load the applicator (see FIG. 2A), label roll 6 is snapped into the label roll holder 11. A label-free section 8*a* of the release liner 8 is then fed into the applicator's liner entrance slot 28 (see FIGS. 2B and 2A). The release liner 8 is then pulled over the stripper bar roller 22 and fed into the friction drive entrance slot 12 (see, FIG. 1). The release liner 8 is then threaded through the friction drive by repeatedly squeezing the trigger. The release liner 8 will then exit the release liner exit chute 14. The liner tension on the release liner 8 may be released by depressing the liner tension release 20. The liner tension release 20 is located on the rear lip of the exit chute 14. Pressing the liner tension release 20 will overcome the spring force holding the entire liner exit chute 14 and can be used to load, unload, or to help clear a jam in the applicator 2. The thrust roller 44 is then pivoted away from the friction roller 42 to release the release liner 8.

In operation, the release liner 8 passes between the friction drive roller 42 and the thrust roller 44. The thrust roller 44 is held against the release liner 8, and the release liner 8 is held against the friction drive roller 42 by the tension spring 46. The friction drive roller 42 maintains contact with the release liner 8 through the use of the spring loaded thrust roller 44 which maintains the proper tension in the drive system. The friction drive roller 42 is geared to contact the idler gear 40.

Figure 5A:
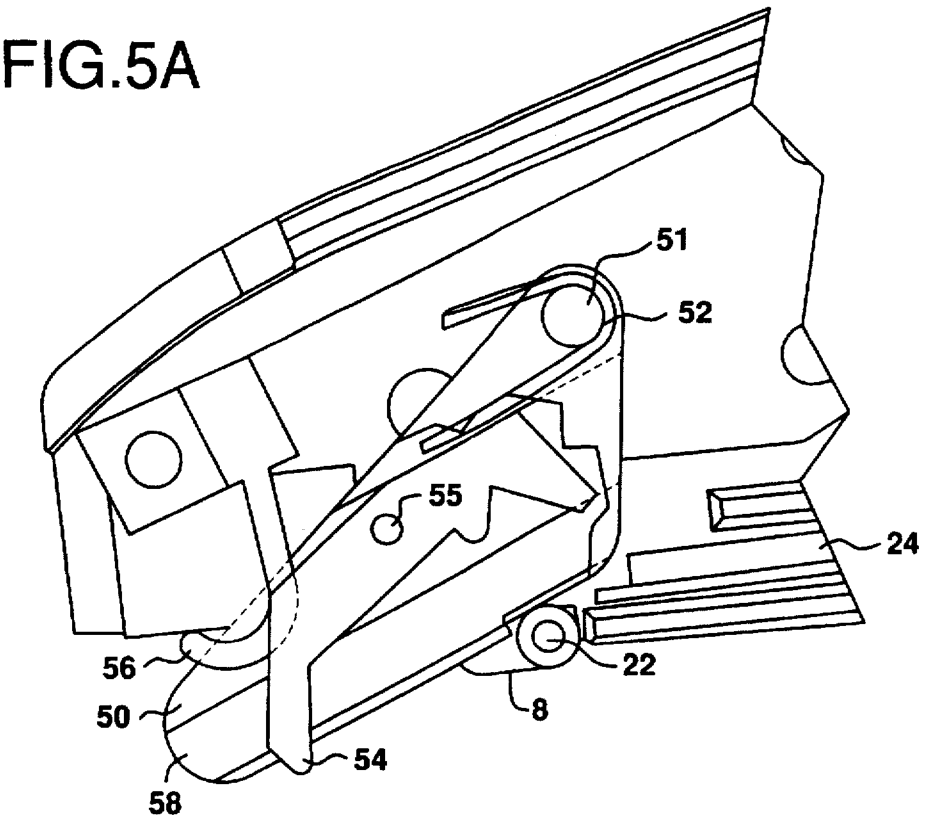
FIGS. 5A and 5B show cut-away views of the indexer module of the hand held application of FIG. 1.
Figure 5B:
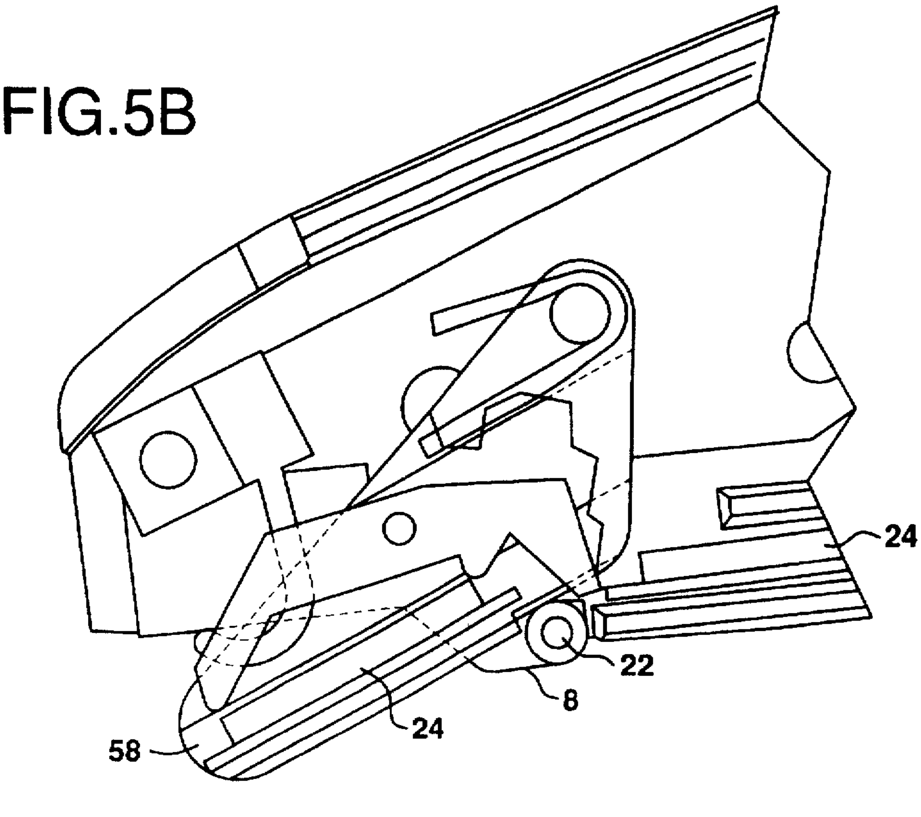

FIGS. 5A and 5B show a cut-away view of a first form of an indexer module 30 useable with the applicator 2. The indexer module 30 holds in place a label holder 50 and a label holder return spring 52. These are both mounted on the dispensing end 13 of the plastic body 4 of the hand held applicator 2. The label holder 50 rotates on a label holder shaft 51. Provided adjacent to the label holder 50 is a paddle 54. The paddle 54 rotates on the paddle shaft 55.

The label 24 is advanced off of the release liner 8 into the label holder 50 by the release liner 8 pulling a label 24 over the stripper bar roller 22. The drive system is set to advance a label 24 approximately 0.100 inches beyond the maximum pitch (distance between labels) set for a label 24. This apparent over travel of the label 24 is used to make up for the varying (and high tolerance) pitches that are encountered in labels 24 of this type.

To prevent a label 24 from over-travelling on top of one ready to be applied in the label holder 50, a spring loaded pivoting paddle 54 snaps into place in back of the label 24 in the label holder 50. The paddle 54 is actuated by the label 24 going into the label holder 50 and pushing the front of the paddle 54 which pivots on its shaft 55 and causes the back end of the paddle 54 to fall preventing the next label 24 from advancing. The paddle 54 actually forms a door between the label 24 in the label holder 50 and the next label 24 on the release liner 8.

When the next label 24 on the release liner 8 runs into the backside of the paddle 54, the force required to pull the release liner 8 over the stripper bar 22 increases. This causes the spring loaded thrust roller 44 in the drive module 32 to disengage slightly from the friction drive roller 42 causing the release liner 8 to slip between the friction drive roller 42 and the thrust roller 44. This release prevents the user from jamming the label 24 into the paddle 54, potentially damaging it. The user will be unable to advance another label 24 into the label holder 50 until the label 24 in the holder 50 is applied. The label holder 50 holds the label 24 in place by two concave channels 58 running along the side of the label holder 50.

Figure 6:
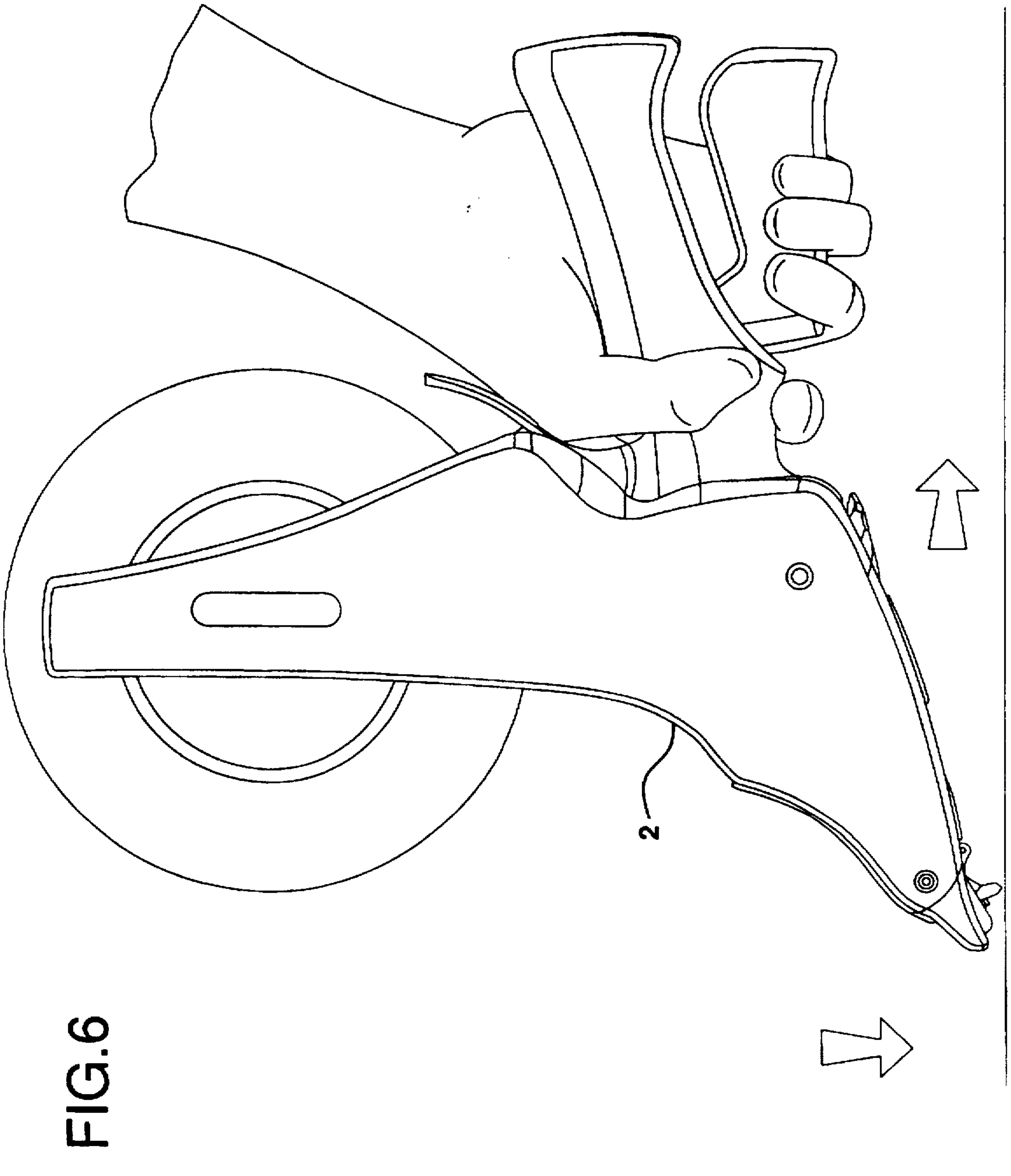
FIG. 6 shows use of the applicator of FIG. 1 to apply a label to a product.

The label 24 in the label holder 50 is applied to a product package in a down and back motion as shown in FIG. 6. The label holder 50 protrudes from the applicator 2. As a user applies a label 24 on a product package, the action causes the label holder 50 to pivot about its mounting shaft 51. The paddle 54 moves up with the label holder 50 as the label 24 is applied. The label holder 50 is allowed to advance upwards further than the paddle 54. This allows the label to slide forward out of the label holder 50.

The tamp element 56 applies pressure to the top of the label when the label holder 50 is pressed upwards. As the paddle 54 moves up, it snaps back into its starting position through the spring supplied force of spring 52, deactivating the indexing mechanism so that another label 24 may be advanced by the user depressing the trigger 10. The label holder 50 returns to its starting position also through the force of spring 52. The tamp element 56 contacts the label 24 during application to allow the adhesive on the label 24 to adhere the label to the product package surface.

Figure 7:
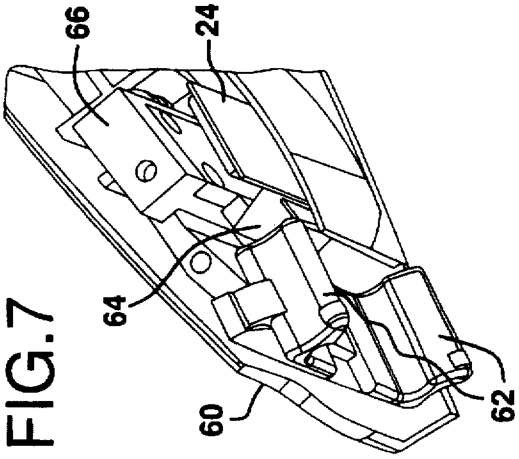
FIG. 7 shows an isometric view of an alternate indexer module usable in the hand held applicator of FIG. 1.

FIG. 7 shows an isometric view of another form of an indexer module useable with the applicator 2. This indexer module identified as 60 is a pure tamping indexer module and carries two label holders 62. The label holders 62 are at the front end of the indexing module 60 which includes an indexer stopper 64 attached to a base unit 66.

Figure 8A:
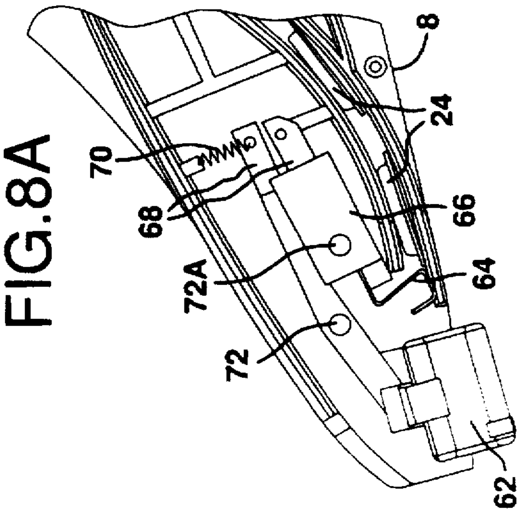
FIGS. 8A through 8C show cut-away views of the operation of the indexer module of FIG. 7 in the application of a label.
Figure 8B:
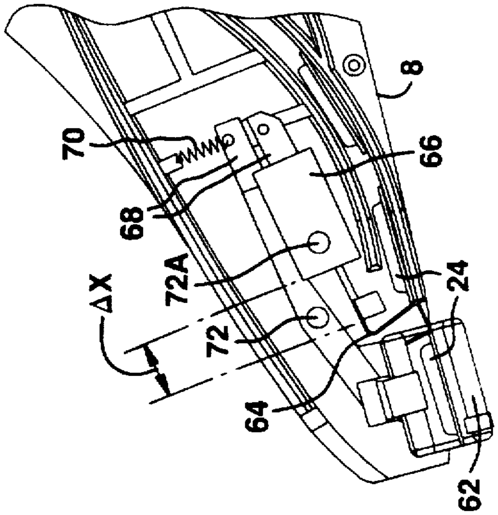
Figure 8C:
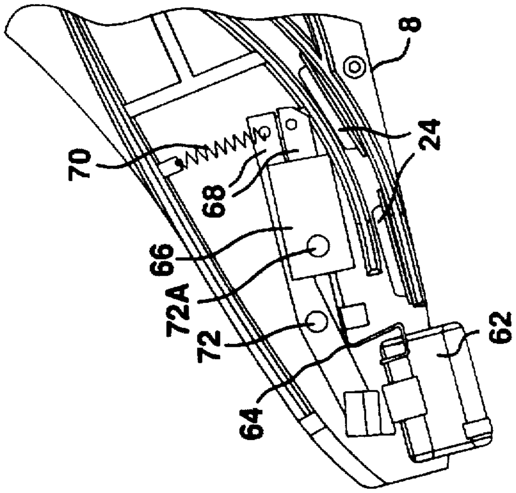

FIGS. 8A through 8C show in more detail the module 60 incorporated in the applicator 2 and application of a label using the module. Linkages 68 connect the base unit 66 and the label holder 62 to an extension spring 70 which is attached to the plastic body 4. The linkages 68 rotate about pivot 72, while the base unit 66 rotates about pivot 72A.

In FIG. 8A a first label 24 entering the label holder 62 is pushed along by the indexer stopper 64 which is advanced by movement of a second label 24 following the first label. As the second label moves, it pushes the indexer stopper 64 forward thereby causing the first label 24 to be released from the release liner and to enter the label holder 62 as shown in FIG. 8B. The indexer stopper 64 has moved a distance $\Delta X$ at this time, as is also shown in FIG. 8B. This movement also causes the extension spring 70 to be compressed holding the label holder 62 down and protruding from the indexing module 60. The label 24 held in the label holder 62 is then tamped into place via user motion.

Label overlap in the label holder 62 is prevented by the indexer stopper 64. The indexer stopper 64 is disengaged during label application through the linkages 68. Once the label 24 is applied with a tamping motion the indexer stopper 64 is raised so that the base unit 66 pulls the indexer stopper 64 back along the distance $\Delta X$ as shown in FIG. 8B. The next label 24 can then be advanced partially into the label holder 62 without being stopped by the indexer stopper 64. Once the label has been pushed partially into the label holder 62, the indexer stopper 64 falls into place as shown in FIG. 8A and the process of applying this next label is repeated as shown in FIGS. 8B and 8C.

Figure 9:
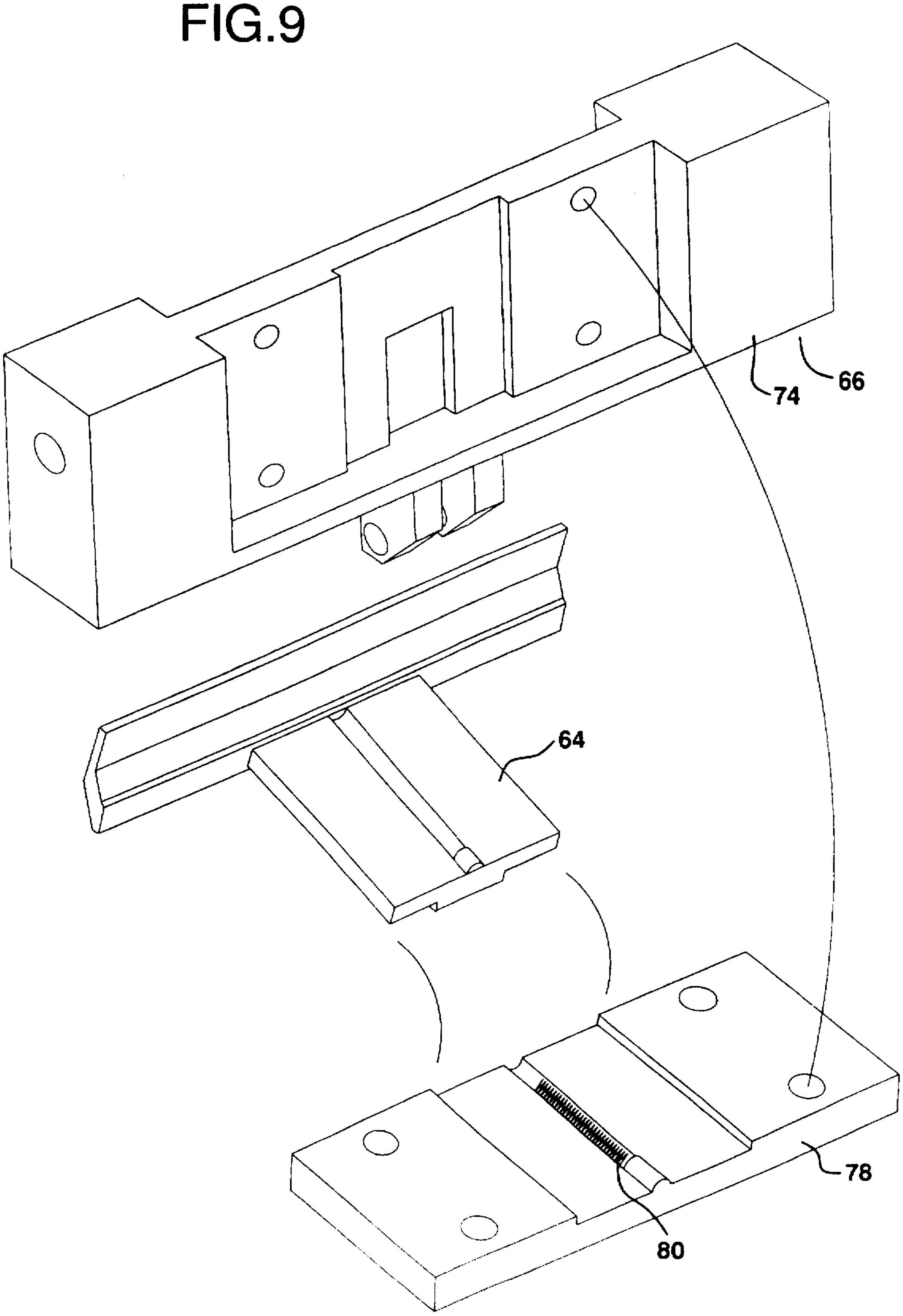
FIG. 9 shows an exploded view of the base unit of the indexer module of FIG. 7.

FIG. 9 shows an exploded view of the base unit 66 and indexer stopper 64. A base 74 is provided containing the stopper 64 and a cover 78. The cover 78 contains a compression spring 80 which provides tension to retract the stopper 64. Placing the compression spring 80 in the cover 78 provides an efficient use of available space for the compression spring 80. The extension spring 70 loads the stopper vertically and the compression spring 80 loads the stopper horizontally. The mechanical advantages of the linkages 68 enables the forces on the labels 24 to be kept at a minimum (preventing damage to the labels), while maintaining stopper 64 in contact with the label.

Figure 10A:
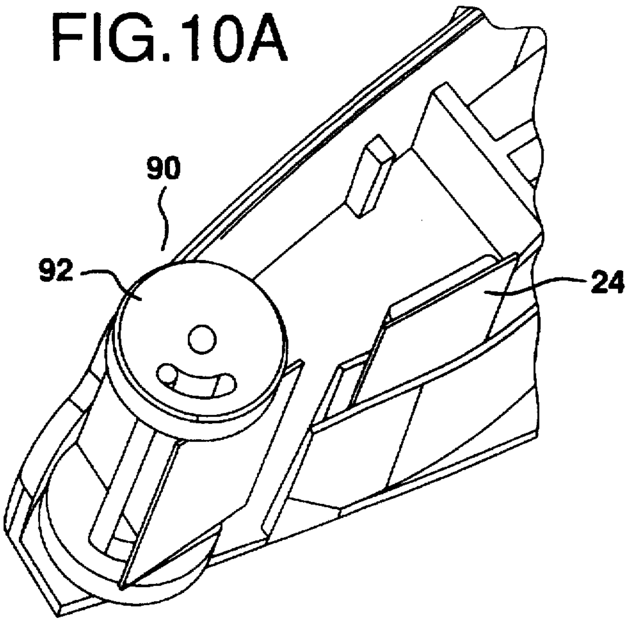
FIG. 10A shows an isometric view of an alternate label holder usable in the hand held applicator of FIG. 1.

FIG. 10A shows an isometric view of a further embodiment of a label holder which can be used with the applicator 2 of the present invention. This label holder permits the applicator to apply a label by a pure wiping action. The label holder of FIG. 10A can be adapted for use with any of the indexer modules, i.e., either the paddle or linked index modules described above. The label holder 90 comprises a cylinder 92 which holds the label 24 by its edges and a cam 94 that pushes the label 24 out of the label holder 90 during application.

Figure 10B:
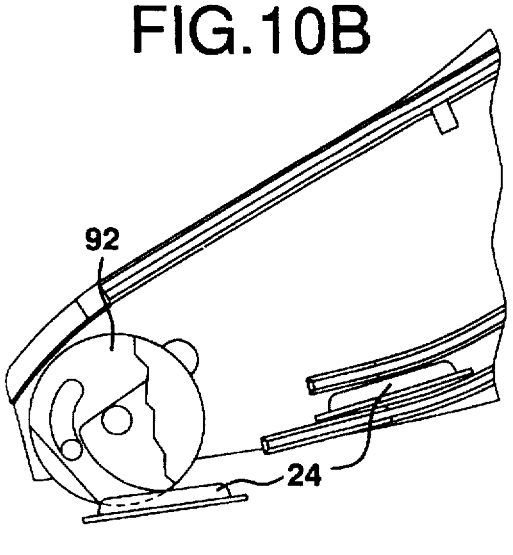
FIGS. 10B and 10C show operation of the label holder of FIG. 10A in the application of a label.
Figure 10C:
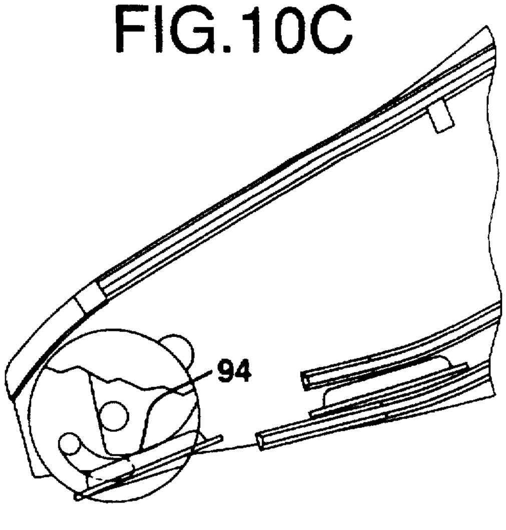

FIGS. 10B and 10C show the application of a label using the label holder 90. After a label 24 has been advanced into the label holder cylinder 92, it is wiped across the product surface. This causes the cylinder 92 to roll clockwise, tamping the label 24 onto the product surface through the cam surface 94 in the label holder 90.

It should be noted that the trigger 10 of the applicator 2 has been configured to enable the trigger to be activated by using the middle, ring and pinkie fingers of the user. This allows the index finger and thumb to be free for gripping and balancing the applicator (see, FIG. 6). Additionally, the wrist guard 18 of the applicator allows the weight of the applicator to be distributed over the hand, reducing fatigue to the user's fingers. Finally, the index module 30 of the applicator is positioned to provide an unobstructed view (over the label roll 6) of the label about to be applied, enhancing placement accuracy.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. An applicator for use in applying EAS labels adhered to a release liner, the release liner with said labels being in the form of a roll, comprising:

a body having a trigger and a roll holder for supporting said rolled release liner;

a friction drive means responsive to said trigger for controlling and advancing the release liner through said applicator;

an indexing means for stripping labels from said release liner when advanced by said friction drive means and positioning said released labels in an applicator means, said indexing means being operable for label formats of varying pitch;

an applicator means for applying the labels positioned by said indexing means; and said friction drive means including a tensioning means having a drive slip means which allows the friction drive means to slip when a label is positioned by said indexing means in said applicator means.

2. The applicator in accordance with claim 1 wherein the pitch of said label formats varies to a largest pitch and wherein said drive slip means slips when the label having the largest pitch is positioned in said applicator means, enabling the label having the largest pitch to be completely stripped from the release liner.

3. The applicator in accordance with claim 2 wherein said friction drive means includes a friction drive and a thrust roller, said thrust roller and said friction drive roller trapping the release liner therebetween, and said applicator further includes linkages linking said friction drive roller and said trigger so that said trigger can actuate said friction drive roller.

4. The applicator in accordance with claim 3 further comprising a quick release means which allows tension from said friction drive means to be released by removing said thrust roller from frictional contact with said friction drive roller.

5. The applicator in accordance with claim 1 and further wherein said roll holder includes protrusions to grasp said rolled release liner.

6. An applicator in accordance with claim 1 wherein:

said trigger is adapted to be activated by using the middle, ring and pinkie fingers of a user.

7. An applicator in accordance with claim 1 wherein:

said body further includes a wrist guard adapted to allow the weight of the applicator to be distributed over the hand of the user.

8. An applicator in accordance with claim 1 wherein:

said indexing means is positioned sufficiently forward of the rolled release liner to provide an unobstructed view over the rolled release liner of a label about to be applied.

9. An applicator for use in applying EAS labels adhered to a release liner, the release liner with said labels being in the form of a roll, comprising:

a body having a trigger and a roll holder for supporting said rolled release liner;

a friction drive means responsive to said trigger for controlling and advancing the release liner through said applicator;

an indexing means for stripping labels from said release liner when advanced by said friction drive means and positioning said released labels in an applicator means, said indexing means being operable for label formats of varying pitch;

an applicator means for applying the labels positioned by said indexing means; and said indexing means including a slipping actuator to allow positioning labels having label formats of varying pitch by causing said friction drive means to slip once a label is positioned in said applicator means.

10. The applicator in accordance with claim 9 wherein said applicator means includes a label holder which holds the label after the label is stripped from the release liner, the label holder positioned so the label protrudes from said body.

11. The applicator in accordance with claim 10 wherein said label holder includes two concave channels which hold the label.

12. The applicator in accordance with claim 10 wherein said applicator means further comprises a spring loaded pivoting paddle, said paddle operable to prevent a succeeding label from travelling into said label holder when said label holder contains a label.

13. The applicator in accordance with claim 12 wherein said paddle is deactivated and reset when the label is removed from said label holder allowing another label to enter said label holder.

14. The applicator in accordance with claim 13 wherein said paddle is pivoted when the label is located in said label holder, said paddle when pivoted by a label located in the label holder operable to block a succeeding label from travelling into said label holder.

15. The applicator in accordance with claim 14 wherein said paddle is operable to pivot when the label is removed from said label holder to a position to allow a succeeding label to enter into said label holder.

16. The applicator in accordance with claim 15 wherein said applicator means includes a tamp means located such that when said paddle and said label holder are pivoted upwards by pressing a label in said label holder on an object, said tamp means is operable to press the label against the object and allow the label to slide out of said label holder and past said paddle.

17. The applicator in accordance with claim 10 wherein said label holder includes two label holder elements.

18. The applicator in accordance with claim 10 wherein said indexing means includes an indexer/stopper, said indexer/stopper operable to allow a succeeding label to push a preceding label into said label holder and to prevent the succeeding label from travelling into said label holder when said label holder contains a label.

19. The applicator in accordance with claim 18 wherein said indexer/stopper is deactivated and reset when the label is removed from said label holder using a tamping motion, thus allowing another label to enter said label holder.

20. The applicator in accordance with claim 19 wherein said applicator includes an extension spring attached at one end to said body and the other end to said indexer/stopper, said indexer/stopper being held between the labels by said extension spring, said indexer/stopper remaining between the labels while a label is located in the label holder and is operable to block a succeeding label from travelling into said label holder.

21. The applicator in accordance with claim 20 wherein said indexer/stopper is operable to raise against said extension spring when the label is removed from said label holder and retract to a position where said indexer/stopper is positioned above a succeeding label ready to enter into said label holder.

22. The applicator in accordance with claim 21 and further comprising:

a) a cover surrounding said indexer/stopper; and b) a compression spring incorporated into said cover for retracting said indexer/stopper.

23. The applicator in accordance with claim 21 and further comprising:

an arm linkage for connecting said indexer/stopper to said extension spring.

24. The applicator in accordance with claim 10 wherein said label holder includes a cylindrical means which hold said label by the edges of the label.

25. The applicator in accordance with claim 24 wherein said cylindrical means includes a cam which pushes the label out of the cylindrical means when the label is wiped across a surface, said cylindrical means is operable to roll and said cam is operable to push the label onto the surface through its cam motion.

26. An applicator for use in applying EAS labels adhered to a release liner, the release liner with said labels being in the form of a roll, comprising:

a body having a trigger and a roll holder for supporting said rolled release liner;

a friction drive means responsive to said trigger for controlling and advancing the release liner through said applicator;

an indexing means for stripping labels from said release liner when advanced by said friction drive means and positioning said released labels in an applicator means, said indexing means including a slipping actuator to allow positioning labels having label formats of varying pitch;

an applicator means for applying the labels positioned by said indexing means; and said indexing means is modular and is removable and insertable into the body without removing said drive means.

27. A method for use in applying EAS labels adhered to a release liner, the release liner with said labels being in the form of a roll, comprising:

providing a body having a trigger and a roll holder for supporting said rolled release liner;

controlling and advancing the release liner through said applicator using a friction drive means responsive to said trigger;

stripping labels from said release liner when advanced by said friction drive means and positioning said released labels in an applicator means using an indexing means.;

applying the labels positioned by said indexing means using an applicator means; and said friction drive means including a tensioning means having a drive slip means which allows the friction drive means to slip when a label is positioned by the indexing means in the applicator means.

28. The method in accordance with claim 27 wherein the drive slip means includes a slip means for allowing the drive means to slip when the label is correctly positioned, enabling the largest pitch label to be completely stripped from the release liner.

29. The method in accordance with claim 28 wherein the friction drive means includes a friction drive and the roller clutch includes a thrust roller, the thrust roller and the friction drive roller trapping the release liner therebetween, and the applicator further includes linkages linking the friction drive roller and the trigger so that the trigger can actuate the friction drive roller.

30. The method in accordance with claim 29 wherein the friction drive includes a quick release means which allows tension from the friction drive means to be released by removing the thrust roller from frictional contact with the friction drive roller.

31. A method for use in applying EAS labels adhered to a release liner, the release liner with said labels being in the form of a roll, comprising:

providing a body having a trigger and a roll holder for supporting said rolled release liner;

controlling and advancing the release liner through said applicator using a friction drive means responsive to said trigger;

stripping labels from said release liner when advanced by said friction drive means and positioning said released labels in an applicator means using an indexing means;

applying the labels positioned by said indexing means using an applicator means; and the indexing means includes a slipping actuator to allow positioning labels having formats of varying pitch by causing the friction drive means to slip once a label is positioned in the applicator means.

32. The method in accordance with claim 31 wherein the holder means includes a label holder which holds the label after the label is stripped from the release liner, the label holder positioned so the label protrudes from the indexing means.

33. The method in accordance with claim 32 wherein the label holder includes two concave channels which hold the label.

34. The method in accordance with claim 32 wherein the applicator means further comprises a spring loaded pivoting paddle, the paddle operable to prevent a label from travelling into the label holder when the label holder contains a label.

* * * * *